United States Patent
Abrams

(12) 
(10) Patent No.: US 6,929,771 B1
(45) Date of Patent: Aug. 16, 2005

(54) METHOD OF DECORATING A MOLDED ARTICLE

(75) Inventor: Louis Brown Abrams, Fort Collins, CO (US)

(73) Assignee: High Voltage Graphics, Inc., Fort Collins, CO (US)

(*) Notice: Subject to any disclaimer, the term of this patent is extended or adjusted under 35 U.S.C. 154(b) by 0 days.

(21) Appl. No.: 09/629,746

(22) Filed: Jul. 31, 2000

(51) Int. Cl.[7] .............................................. B29C 45/14
(52) U.S. Cl. .................. 264/511; 264/135; 264/243; 264/247; 264/250; 264/257; 264/275; 264/265
(58) Field of Search ................... 264/511, 135, 243, 264/247, 250, 257, 275, 265

(56) References Cited

U.S. PATENT DOCUMENTS

| | | | |
|---|---|---|---|
| 1,905,989 A | 4/1933 | Safir et al. ................... 428/189 |
| 1,905,999 A | 4/1933 | Ellis | |
| 2,636,837 A | 4/1953 | Summers ..................... 154/123 |
| 3,529,986 A | 9/1970 | Kappas et al. ................. 117/17 |
| 3,657,060 A | 4/1972 | Haigh .......................... 161/73 |
| 3,775,205 A | 11/1973 | Hermann et al. ............. 156/72 |
| 3,793,050 A | 2/1974 | Mumpower, Jr. .......... 117/17.5 |
| 3,816,060 A | 6/1974 | Koskolos .................... 431/350 |
| 3,816,211 A | 6/1974 | Haigh ........................ 156/309 |
| 3,936,554 A | 2/1976 | Squier | |
| 3,956,552 A | 5/1976 | Geary ........................... 428/88 |
| 3,989,869 A | 11/1976 | Neumaier et al. ........... 428/254 |
| 4,018,956 A | 4/1977 | Casey .......................... 428/86 |
| 4,034,134 A | 7/1977 | Gregorian et al. ............ 428/86 |
| 4,035,532 A | 7/1977 | Gregorian et al. ............ 428/90 |
| 4,102,562 A | 7/1978 | Harper et al. ............... 350/105 |
| 4,142,929 A | 3/1979 | Otomine et al. .............. 156/72 |
| 4,160,851 A | 7/1979 | Lienert et al. .............. 427/379 |
| 4,201,810 A | 5/1980 | Higashiguchi ................ 428/90 |
| 4,269,885 A | 5/1981 | Mahn .......................... 428/216 |
| 4,273,817 A | 6/1981 | Matsuo et al. ................ 428/90 |
| 4,282,278 A | 8/1981 | Higashiguchi ................ 428/90 |
| 4,292,100 A | 9/1981 | Higashiguchi ................ 156/72 |
| 4,314,813 A | 2/1982 | Maskai .......................... 8/468 |
| 4,314,955 A | 2/1982 | Boden et al. ................. 264/51 |
| 4,340,623 A | 7/1982 | Justus ........................ 427/361 |
| 4,369,157 A | 1/1983 | Conner ....................... 264/246 |
| 4,385,588 A | 5/1983 | Bennetot .................... 118/638 |
| 4,388,134 A | 6/1983 | Long et al. ................. 156/248 |
| 4,396,662 A | 8/1983 | Higashiguchi ................ 428/90 |
| 4,405,401 A | 9/1983 | Stahl .......................... 156/248 |
| 4,423,106 A | 12/1983 | Mahn .......................... 428/207 |
| 4,539,166 A | 9/1985 | Richartz et al. ........... 264/45.1 |
| 4,574,018 A | 3/1986 | Masuda et al. ............... 156/72 |
| 4,582,658 A | 4/1986 | Reichmann et al. ....... 264/45.1 |

(Continued)

FOREIGN PATENT DOCUMENTS

DE          019734316 A1    2/1999

(Continued)

OTHER PUBLICATIONS

Film Insert Molding Technology. Mark Matsco, Patrick Griffin. 1997.

(Continued)

Primary Examiner—Edmund H. Lee
(74) Attorney, Agent, or Firm—Sheridan Ross P.C.

(57) ABSTRACT

A method of providing a molding article with a plush surface is provided. The method includes providing a flocked transfer, securing the transfer in place in a mold, and molding the article such that the transfer is embedded in the surface of the article. The article can be injection molded.

57 Claims, 2 Drawing Sheets

U.S. PATENT DOCUMENTS

| | | |
|---|---|---|
| 4,652,478 A | 3/1987 | Maü .......................... 428/43 |
| 4,668,323 A | 5/1987 | Lenards et al. ............. 156/242 |
| 4,681,791 A | 7/1987 | Shibahashi et al. .......... 428/96 |
| 4,687,527 A | 8/1987 | Higashiguchi ............... 156/72 |
| 4,741,791 A | 5/1988 | Howard et al. ............... 156/72 |
| 4,790,306 A | 12/1988 | Braun et al. ............ 128/206.12 |
| 4,793,884 A | 12/1988 | Horikiri ....................... 156/247 |
| 4,797,320 A | 1/1989 | Kopp et al. .............. 428/316.6 |
| 4,810,321 A | 3/1989 | Wank et al. ........... 156/244.23 |
| 4,810,549 A | 3/1989 | Abrams et al. .............. 428/88 |
| 4,812,247 A | 3/1989 | Fahner et al. ................ 252/511 |
| 4,980,216 A | 12/1990 | Rompp ........................ 428/90 |
| 5,008,130 A | 4/1991 | Lenards ....................... 427/206 |
| 5,009,950 A | 4/1991 | Wagner et al. .............. 428/290 |
| 5,041,104 A | 8/1991 | Seal ............................ 604/367 |
| 5,043,375 A | 8/1991 | Henning et al. ............. 524/372 |
| 5,047,103 A | 9/1991 | Abrams et al. ............... 156/72 |
| 5,053,179 A | 10/1991 | Masui et al. ................. 264/257 |
| 5,108,530 A | 4/1992 | Niebling, Jr. et al. ....... 156/245 |
| 5,154,871 A | 10/1992 | Wagner et al. .............. 264/255 |
| 5,198,277 A | 3/1993 | Hamilton et al. ............. 428/92 |
| 5,207,851 A | 5/1993 | Abrams et al. .............. 156/230 |
| 5,217,563 A | 6/1993 | Niebling et al. ............. 156/382 |
| 5,217,781 A | 6/1993 | Kuipers ....................... 428/85 |
| 5,248,536 A | 9/1993 | Du Katz ...................... 428/40 |
| 5,274,039 A | 12/1993 | Sirinyan et al. ............. 525/130 |
| 5,346,746 A | 9/1994 | Abrams ...................... 428/195 |
| 5,350,474 A | 9/1994 | Yamane ...................... 156/240 |
| 5,489,359 A | 2/1996 | Yamane ...................... 156/540 |
| 5,534,099 A | 7/1996 | Yamamoto .................. 156/230 |
| 5,597,637 A | 1/1997 | Abrams et al. ............... 428/90 |
| 5,622,587 A | 4/1997 | Barthelman .................. 156/251 |
| 5,693,400 A | 12/1997 | Hamilton et al. ............. 428/89 |
| 5,762,379 A | 6/1998 | Salmon et al. ................ 283/91 |
| 5,766,397 A | 6/1998 | Jones .......................... 156/230 |
| 5,804,007 A | 9/1998 | Asano .......................... 156/72 |
| 5,858,156 A | 1/1999 | Abrams et al. ............. 156/230 |
| 5,900,096 A | 5/1999 | Zemel ......................... 156/233 |
| 5,909,021 A * | 6/1999 | Duffy ........................... 200/514 |
| 5,912,065 A | 6/1999 | Kukoff ........................ 428/195 |
| 5,922,436 A * | 7/1999 | Banfield et al. ............. 428/100 |
| 5,981,009 A | 11/1999 | Iacono et al. ............... 428/40.1 |
| 6,010,764 A | 1/2000 | Abrams ........................ 428/90 |
| 6,083,332 A | 7/2000 | Abrams ........................ 156/72 |
| 6,102,686 A | 8/2000 | Eschenfelder ............... 425/388 |
| 6,110,560 A | 8/2000 | Abrams ........................ 428/90 |
| 6,113,149 A | 9/2000 | Dukatz ........................ 283/91 |
| 6,146,485 A | 11/2000 | Iacono et al. ............... 156/230 |
| 6,170,881 B1 | 1/2001 | Salmon et al. ................ 283/91 |
| 6,171,678 B1 | 1/2001 | Holeschovsky et al. ...... 428/97 |
| 6,202,549 B1 | 3/2001 | Mitsam et al. ................ 101/27 |
| 6,224,707 B1 | 5/2001 | Lion ........................... 156/230 |
| 6,249,297 B1 | 6/2001 | Lion ........................... 347/717 |
| 6,257,866 B1 | 7/2001 | Fritz et al. ................. 425/387.1 |
| 6,264,775 B1 | 7/2001 | Holeschovsky et al. ...... 156/72 |
| 6,277,312 B1 | 8/2001 | Hansen et al. ............... 264/132 |
| 6,296,908 B1 | 10/2001 | Reihs et al. ............. 427/393.5 |
| 6,299,715 B1 | 10/2001 | Langsdorf et al. ............ 156/72 |
| 6,387,472 B1 | 5/2002 | Reck et al. .................. 428/195 |
| 6,428,877 B1 | 8/2002 | Suss et al. ................... 428/195 |
| 6,451,148 B1 | 9/2002 | Jenner ......................... 156/230 |
| 6,787,589 B2 | 9/2004 | Weaver et al. |

FOREIGN PATENT DOCUMENTS

| | | |
|---|---|---|
| EP | 210304 | 4/1987 |
| EP | 280296 A2 | 2/1988 |
| EP | 88102819.5 | 2/1988 |
| EP | 351079 A3 | 6/1989 |
| EP | 685014 B1 | 6/1997 |
| EP | 989227 | 3/2000 |
| EP | 989227 A2 | 3/2000 |
| FR | 2659094 A1 | 9/1991 |
| FR | 2784619 A1 | 10/1998 |
| FR | 2784619 | 4/2000 |
| GB | 1466271 | 12/1973 |
| GB | 1 447 049 | 8/1976 |
| GB | 2 065 031 A | 6/1981 |
| GB | 2 126 951 A | 4/1984 |
| IE | 55104 | 4/1984 |
| JP | 356058824 A | 5/1981 |
| JP | 56141877 A2 | 11/1981 |
| JP | 58062027 A * | 4/1983 |
| JP | 359115885 A | 4/1984 |
| JP | 59106944 A * | 6/1984 |
| JP | 02000084977 | 3/2000 |
| WO | WO 79/01146 | 12/1979 |
| WO | WO 89/01829 | 3/1989 |
| WO | WO 90/09289 * | 8/1990 |
| WO | WO 9419530 | 9/1994 |
| WO | W/O 02/07959 A1 | 1/2002 |

OTHER PUBLICATIONS

Lexan In-Mold Films. GE Structured Products. Jan. 1999.
Declaration of L. Brown Abrams under 37 CFR § 1.98 for Appl. No. 09/621,830 dated Jan. 16, 2004, 2 pages.
"Hettinga: Plastics Technology for the Future, Available Today!" website (circa 2000), 4 pages.
Copy of PCT Written Opinion for PCT Application No. PCT/US03/21302 dated Nov. 26, 2004.
Stahls'; *New Product Bulletin*.
Agion Technologies, LLC; *The Most Advanced Antimicrobial Silver Delivery System*.
Bayer Plastics Division Press Release, *Wheel Covers, Center Caps Become Revolving Art Forms with New Film Insert Molding Technology*.
Sonics & Materials, Inc., *Chart II Compatability of Thermoplastics*.
Shaner; *Advanced Molding Processes: Low Pressure Molding/Low-High Pressure Molding for Interior Trim*; 1997.
Snyder; *Fabric Molding Shows Promise in Automotive*, 1999.
Takatori; *Dieprest In-mold Laminate Technology*, 1999.
Defosse; *Systems Approach Gives Blow Molders Big Edge*, 2000.
U.S. Appl. No. 09/621,830, filed Jul. 24, 2000, Abrams.
U.S. Appl. No. 09/735,721, filed Dec. 13, 2000, Abrams.
U.S. Appl. No. 10/265,206, filed Oct. 4, 2002, Abrams.
U.S. Appl. No. 10/394,357, filed Mar. 21, 2003, Abrams.
U.S. Appl. No. 10/455,541, filed Jun. 4, 2003, Abrams.
U.S. Appl. No. 10/455,575, filed Jun. 4, 2003, Abrams.
U.S. Appl. No. 10/614,340, filed Jul. 3, 2003, Abrams.
U.S. Appl. No. 10/613,981, filed Jul. 3, 2003, Abrams.
U.S. Appl. No. 10/613,982, filed Jul. 3, 2003, Abrams.
U.S. Appl. No. 10/614,399, filed Jul. 3, 2003, Abrams.
U.S. Appl. No. 10/670,091, filed Jul. 3, 2003, Abrams.
Abrams, Brown, "Flocking A Touch of Velour" ScreenPrinting (Apr. 1987).
Abrams, Brown, "Part II: Flocking" ScreenPrinting (Jun. 1987).
Bostik Findley USA, "Industrial Adhesives" (2001), 3 pages.
Declaration of L. Brown Abrams under 37 CFR 1.132 for 09/735,721 dated Jan. 7, 2003.
Landwehr, Rebecca, "When is a mouse pad really a rug?"*The Denver Business Journal* (Nov. 1998), at http://denver.bizjournals.com/denver/stories/1998/11/30/story3.html.

Lextra® MouseRug® ; "About the Product" (Jan. 27, 1999), http://www.mouserug.com/mouserug/aboutmouserugs.html, 2 pages.

Lextra® MouseRug® ; "MouseRug Components" (Jan. 27, 1999), http://www.mouserug.com/mouserug/mousecomp.html, 1 page.

Lextra® MouseRug® ; "Dimensions" (Jan. 27, 1999), http://www.mouserug.com/mouserug/dimensions.html, 1 page.

"Magic Carpet" Wired Magazine (Nov. 1998), 1 page.

* cited by examiner

METHOD OF DECORATING A MOLDED ARTICLE

CROSS-REFERENCE TO RELATED APPLICATIONS

Not Applicable

STATEMENT REGARDING FEDERALLY SPONSORED RESEARCH OR DEVELOPMENT

Not Applicable.

FIELD OF THE INVENTION

This invention relates to molded articles having flocked surfaces, and, in particular, to a new and improved method of applying flocked transfers to molded products.

BACKGROUND OF THE INVENTION

It's often desirable to decorate molded plastic parts for aesthetic or practical purposes. Injection molded articles are often decorated using inks, screen printing, pad printing, direct electrostatic flocking and hot stamping. These methods are most often post-molding operations requiring additional processing and cost and time. In addition, the resulting quality of the product is often low, due to the low quality of adhesion or unevenness of the coating.

Recently In-Mold Decoration has been developed to incorporate the application of decoration while the part is being molded to eliminate the extra step; however, a number of problems have developed with this technology that relate to the inability of the ink or decoration to remain stable during the heat and force of injecting the resins into the mold, that relate to the difficulty of getting the inserted decoration to stay in place, and which may relate to the decoration surface becoming smeared, crushed, or otherwise disturbed during injection molding.

SUMMARY OF THE INVENTION

The present invention uses flock heat transfer type media rather than ink-printed film inserts in order to provide a plush, evenly-coated, three-dimensional textured decoration molded together with the hot resins when the part is formed. Using flock transfer media, a plushly textured decoration is permanently attached to the surface of the molded part. In order to accomplish this the hot melt adhesive commonly used with flock heat transfer manufacturing is eliminated so it will not liquefy and ooze out around the decoration in the mold. In addition, another adhesive, such as a tie coat material, may be used instead of a normal hot melt to prevent oozing and to promote adhesion and/or chemical compatibility with the molding resin, when injecting molding a flock transfer directly to the polymer molded article.

The mold preferably has a depression or locating pins or other mechanical parts to assist with aligning and holding the decoration in place. Additionally, "dams" built into the mold around the perimeter of the flock heat transfer may be included in order to prevent seepage of the molding resin into the interstitial spaces of the flock transfer, between the fibers.

To further accommodate the incorporation of such a decoration in the injection mold, the molding process may be modified for example by purposely selecting resins of lower melting point or by injecting the resins in two separate stages, a first more "gentle" injection to set the decoration in place, followed up by a full-pressure normal injection of resin.

DETAILED DESCRIPTION OF THE INVENTION

Figure 1:
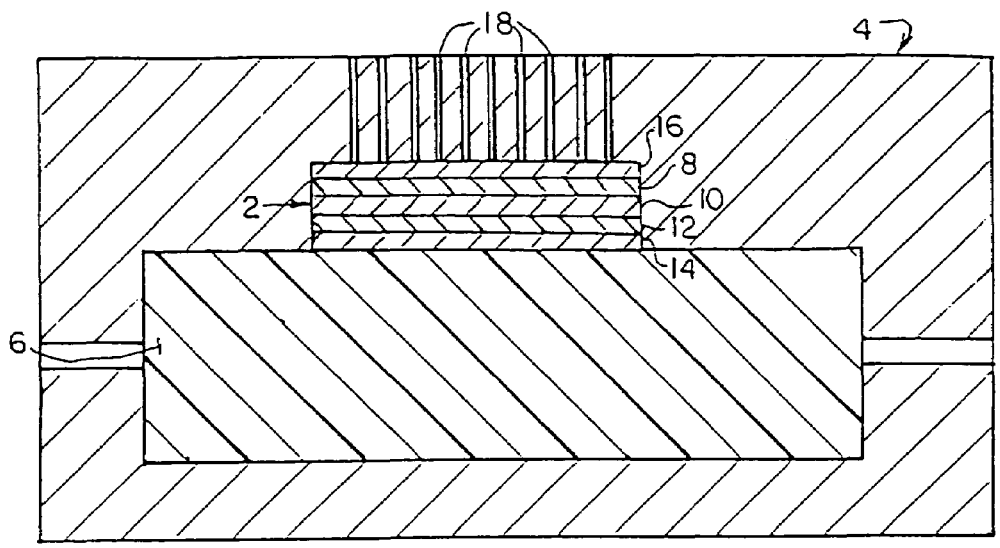
FIG. 1 is a cross-sectional view a flock transfer being applied to an article in a mold, wherein the transfer lies on top of the article.

In FIG. 1, a transfer 2 of the present invention is shown in place in a mold 4 to be co-molded with a plastic article 6. In FIG. 1, the transfer 2 is shown on top of the article 6. The transfer 2 comprises a dimensionally stable sheet 8 to which a conventional flock transfer release adhesive 10, usually silicone wax, is applied in the reverse of a desired pattern or with overall coverage of the sheet, corresponding to the overall image which is to be flocked and transferred. The flock 12 which may be rayon or any other type of material with a conductive finish such as nylon, polyester or the like is applied to the activated adhesive 10 in any conventional manner, such as, conventional electrostatic means, vibration, air flow or gravity. The method of applying the flock 12 to the adhesive 10 depends on the transfer to be achieved—will the transfer be one color or several colors, will the transfer include any non-flock decorations, etc. Thus, the transfer itself, can be a conventional flock transfers, Lextra or Lextra 3-D type transfer, flocked roll goods such as made by Societe D' Enduction et de Flokage, located in Laval, France, from which pieces may be cut out and even preformed to fit better into molds where the surface of the finished product is not flat. The lower ends of the flock 12 are coated with a permanent binder adhesive 14 such as a water based latex which binds the flock into a unit. The binder 14 may contain an additional adhesive, for promoting the adhesion of the transfer to the resin in molding.

A relatively weak pressure-sensitive adhesive 16 can be added to the carrier film 8 in a separate layer, for the purpose of helping to locate the flock transfer 2 in position inside the mold 4 if no mechanical device is available.

Figure 2:
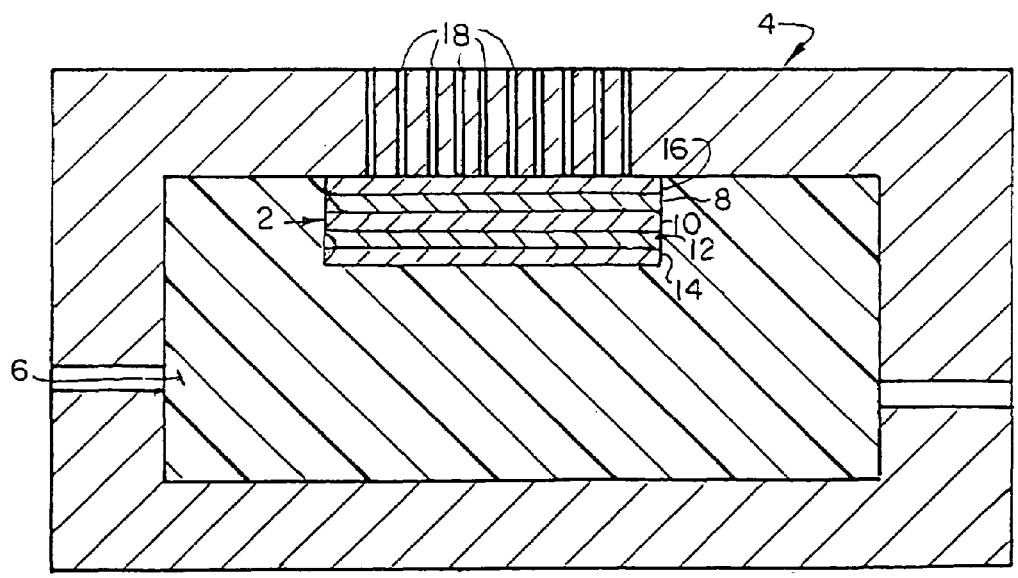
FIG. 2 is a cross-sectional view similar to FIG. 1, but wherein the flock transfer is imbedded in the article.

FIGS. 1 and 2 illustrate the application of the transfer 2 to a molded article 6 during the molding process. The transfer 2 is positioned in the mold 4 using the pressure-sensitive adhesive 12. Other methods, such as the use of a vacuum, can be used to hold the transfer 2 in place in the mold 4 during the molding operation. Vacuum holes 18 are shown in the mold 4 which pass through the mold body. As seen, the transfer 2 is in contact with the vacuum holes 18. A vacuum can be drawn through the holes 18 to hold the transfer 2 in place. The flock transfer needs to be held securely in the mold in order to maintain the transfer in the desired location on the finished plastic part. If a slight depression (of about 1 mm) is built into the mold cavity to accommodate the flock transfer, it will be flush with the molded plastic surface of the finished part. This is seen in FIG. 2. If there is no depression, the flock decoration will stand up on top of the plastic surface, as seen in FIG. 1.

After the transfer is positioned in the mold, the mold is closed and hot resin is injected into the mold. To ensure that the transfer will stay in position during the resin injection, resin with a lower melting point than the release adhesive 16 is used to avoid dislocation of the transfer. On the other hand, if the melt point of any release adhesive utilized, is higher than that of resin, due to the flock providing insulation to the release adhesive, the release adhesive will really not melt in the first place, and is already cross-linked. Hence, criticality of this point may not be that necessary. A particularly preferred method of molding is Reaction Injection Molding (RIM) wherein two base resins are mixed together just as they enter the mold, a chemical reaction occurs at low heat and the plastic material of the end product is formed at that instant.

In an alternative method, lower-pressure injection may be used in a first stage in order to locate and secure the flock transfer in its precise position. Once the transfer is secured in place by the material of the initial injection, a second, full-pressure injection is made to finish the part.

After the resin is injected into the mold, the mold is cooled by circulating water around the exterior of the mold. Although, in some injecting molding processes, utilizing resin, cooling water may already be circulating through the die, during the injection molding process, and thereafter, as known in the art. The mold can be cooled in any other conventional manner. As the resin cools, it solidifies and forms a permanent adhesion to the binder 14. When the part is cooled sufficiently the mold opens up and the part is ejected. Finally, the release sheet 8 and release adhesive 10 are peeled off the fibers 12 to reveal a finished, flocked, surface on the newly molded part.

As an alternative to the invention as described above, it is likely that the flock 12 can be held by other means, to the molded polymer part 6, as follows. While the various release sheets, and release adhesive, may be initially applied to the upper surface of the flock layer, to hold it in position, during molding, rather than utilizing a permanent binder adhesive 14, to hold the flock within or to the molded part, there may be used a thermal setting polyester, such as available from Bostik, Inc., to permanently adhere the ends of the flock material thereto, and likewise, such a sheet will be cross linked into permanent connection with the molded polymer part 6, to provide a very inherently appearing flock surface, upon the molded part, when finished. Thus, the thermal setting polymer material directly cross links with the molding polymer substance, in the injection molding process, and cures with it, to form a permanently flocked product.

Figure 3:
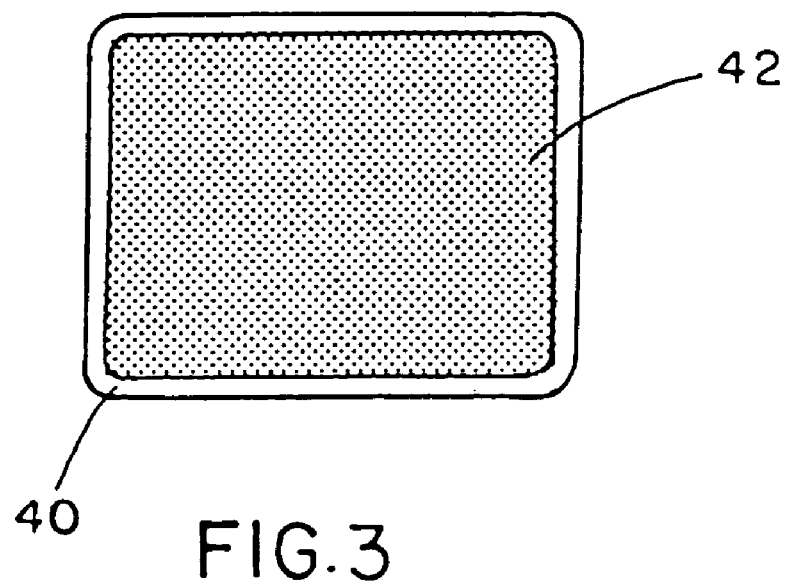
FIG. 3 is a top plan view of an embodiment of the present invention showing the flock transfer inside an injection mold cavity, wherein the flock transfer is created with a border

Since the flock of the transfer forms interstitial spaces between fibers, it is desirable to form a barrier between the mold and the perimeter of the transfer to prevent the resin from entering these interstitial spaces during injection of the resin into the mold. Referring to FIG. 3, a barrier 40 may be formed around the transfer 42. Barrier 40 can be formed during the fabrication of the flock transfer, by providing an excess of binder adhesive 10 around the edge of the transfer. The excess binder adhesive 10 will form a rib or dam around the periphery of the transfer.

Figure 4:
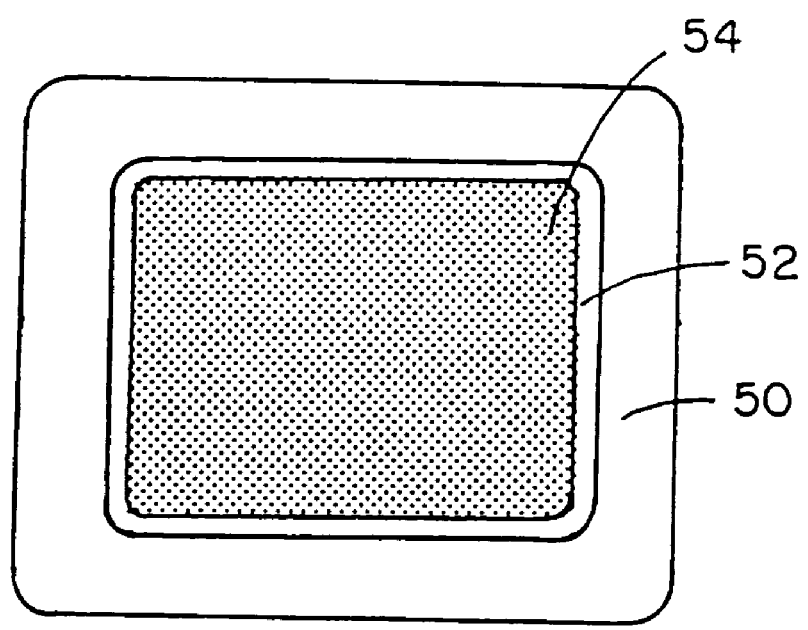
FIG. 4 is a top plan view of an embodiment of the present invention showing the flock transfer inside an injection mold, wherein the mold contains a border.

Alternatively, referring to FIG. 4, the mold 50 may be provided with a barrier 52, which surrounds transfer 54 when the transfer is placed in the mold. Barrier 52 may be an integral part of mold 50, or may be a separate, added barrier which is composed of silicone, latex or other suitable sealing material.

The in mold flock transfer of the present invention finds particular utility in finished plastic parts where a plush surface is desired.

Numerous variations will occur to those skilled in the art of molding in light of the above description. For example, the in-mold flock transfer decoration of the present invention could be adapted to other molding processes, such as blow molding, vacuum forming, rotational molding and transfer molding. The finished plastic part need not be a flat plane, but by virtue of the flexibility of the flock transfer may be rounded, or portions of the part may be raised. These are merely illustrative.

What is claimed is:

1. A method of decorating a molded article comprising:
   providing a transfer having a flocking layer, a release sheet on one side of the flocking layer and a layer of a permanent adhesive on an opposite side of the flocking layer to adhere the transfer to the molded article;
   securing the release sheet to an interior wall of a mold in which the article is made; and
   molding a part from a resin such that the resin contacts the layer of permanent adhesive, wherein the permanent adhesive does not liquefy and ooze out around the flock during molding;
   cooling the mold;
   ejecting the part; and
   removing the release sheet from the transfer.

2. The method of claim 1 wherein the release sheet is affixed to the mold base with an adhesive.

3. The method of claim 1 wherein the permanent adhesive is a thermosetting polyester.

4. The method of claim 1 wherein the permanent adhesive cross links with the resin in the molding step.

5. The method of claim 4 including a step of preventing the resin from entering interstitial spaces between the flock fibers in the flocking layer and wherein the preventing step includes forming a dam around the perimeter of the transfer.

6. The method of claim 5 wherein the dam is formed by placing a barrier in the mold, the transfer being positioned within the barrier.

7. The method of claim 4 wherein the dam is part of the transfer, the dam comprising a built up section of a binder adhesive around the periphery of the transfer.

8. A method of decorating a molded article comprising:
   coating a release sheet with a release adhesive;
   flocking flock into said release adhesive by embedding a first end of said flock into the release adhesive to result in at least one pattern of flock arranged to form a predetermined design adhered to said release sheet having the release adhesive, flock and permanent adhesive thereon;
   applying a permanent adhesive to an opposite side of the flocking;
   affixing said release sheet to the interior surface of a mold; and
   introducing a molten resin in said mold to form the molded article; said permanent adhesive permanently bonding said flock to said article, wherein, under the thermal conditions experienced by the permanent adhesive during molding, the permanent adhesive does not liquefy and ooze out around the flock and wherein the permanent adhesive is positioned between the flock and the resin and cross-linked with a polymer material in a portion of the molded article.

9. The method of claim 8 wherein the permanent adhesive is cross linked with the resin.

10. The method of claim 8 further comprising providing a dam on the surface of the mold, the transfer being applied to the mold within the dam.

11. The method of claim 8 wherein the step of molding the article comprises injecting molten resin into the mold and wherein the permanent adhesive is free of a hot melt adhesive.

12. The method of claim 11 wherein the resin is initially injected at a first pressure, the first pressure being sufficiently low to prevent dislodgment of the transfer from the mold wall; and then providing a second injection of the resin at a second higher pressure.

13. The method of claim 11 wherein the injected resin has a lower melting point than the release adhesive.

14. The method of claim 8 wherein said step of molding said article over said permanent adhesive comprises molding a surface of said article over said permanent adhesive; said surface being a contoured surface.

15. The method of claim 8 wherein said step of molding said article over said permanent adhesive comprises molding a surface of said article over said permanent adhesive; said surface being a generally flat surface.

16. The method of claim 1 wherein the permanent adhesive is a layer of binder adhesive.

17. The method of claim 1 wherein the permanent adhesive is a tie coat material.

18. The method of claim 11 wherein the permanent adhesive is a thermosetting polymer.

19. The method of claim 8 wherein the permanent adhesive is a binder adhesive which adhesively holds said transfer to said article.

20. The method of claim 8 wherein said permanent adhesive is a thermosetting adhesive; said thermosetting adhesive cross-linking with the molded article to hold said transfer to said article.

21. The method of claim 8 wherein said permanent adhesive is a tie coat material.

22. A method for producing a decorated molded article, comprising:
   providing a flocked structure, the flocked structure comprising a plurality of flock fibers adhered to a permanent adhesive;
   positioning the flocked structure in a part of a mold;
   introducing a molten resin into the mold while the flocked structure is positioned in the mold; and
   after solidification of the resin, removing from the mold the decorated molded article comprising the flocked structure, wherein a melting temperature of the permanent adhesive is greater than the maximum temperature experienced by the permanent adhesive during the introducing step, wherein the decorated molded article comprises the flock fibers and permanent adhesive and a molded part, wherein the permanent adhesive is positioned between the flock fibers and the molded part, and wherein the permanent adhesive is cross-linked with a polymer material in a portion of the molded part.

23. The method of claim 22, wherein the permanent adhesive is free of a hot melt adhesive and wherein the introducing step comprises the substep of:
   cooling the mold to cause solidification of the resin.

24. The method of claim 22, wherein the flocked structure comprises multiple colors of flock fibers defining a decorative design and wherein the permanent adhesive crosslinks with the molten resin.

25. The method of claim 22, wherein the flock fibers are resilient and wherein there is no hot melt adhesive layer between the flock fibers and polymer material.

26. The method of claim 22, wherein the flock fibers are at least one of rayon, nylon, and polyester.

27. The method of claim 22, further comprising:
   electrostatically depositing the flock fibers onto an adhesive-coated substrate to form the flocked structure.

28. The method of claim 22, wherein the permanent adhesive is a thermosetting polyester coating lower ends of the flock fibers.

29. The method of claim 22, further comprising:
   maintaining the flocked structure stationary in the closed mold during the introducing step.

30. The method of claim 29, wherein the maintaining step is performed using a vacuum.

31. The method of claim 22, wherein the flocked structure comprises:
   a dimensionally stable sheet;
   the plurality of flock fibers;
   a first release adhesive attaching the plurality of flock fibers to the dimensionally stable sheet; and
   the permanent adhesive coating lower ends of the plurality of flock fibers.

32. The method of claim 31, wherein the dimensionally stable sheet is in contact with a surface of the closed mold and the permanent adhesive is a binder adhesive.

33. The method of claim 32, wherein a second release adhesive is positioned on an opposite side of the dimensionally stable sheet from the first release adhesive to locate the flocked surface in position inside the mold.

34. The method of claim 22, wherein the mold comprises a depression sized to receive the flocked surface.

35. The method of claim 31, wherein a melting point of the first release adhesive is higher than a melting point of the resin.

36. The method of claim 22, wherein the introducing step is performed by an injection molding technique.

37. The method of claim 22, wherein the introducing step is performed by one of the following techniques: reaction injection molding, blow molding, rotational molding, and transfer molding.

38. The method of claim 22, wherein the introducing step comprises:
   first introducing a first resin into the closed mold at a first pressure; and
   second introducing a second resin into the closed mold at a second pressure, wherein the first pressure is less than the second pressure.

39. The method of claim 31, further comprising after the removing step:
   removing the dimensionally stable sheet from the decorated molded article.

40. The method of claim 31, wherein the permanent adhesive is at least one of a thermosetting adhesive and a water based latex.

41. The method of claim 22, wherein the closed mold comprises a raised surface surrounding at least a portion of the flocked surface to prevent the resin from contacting the flock fibers.

42. The method of claim 1 wherein the permanent adhesive is free of a hot melt adhesive.

43. The method of claim 8 wherein the permanent adhesive is free of a hot melt adhesive.

44. The method of claim 22 wherein the permanent adhesive is free of a hot melt adhesive.

45. A method for producing a molded article, comprising:
  providing a flocked structure, the flocked structure comprising a plurality of flock fibers and a permanent adhesive;
  positioning the flocked structure in a part of the mold;
  introducing a molten resin into the mold while the flocked structure is positioned in the mold to form the decorated molded article, the decorated molded article comprising a molded part, the flock fibers, and permanent adhesive, wherein the molded part comprises the resin, wherein the permanent adhesive is positioned between the flock fibers and the molded part, wherein there is no hot melt adhesive layer located between the permanent adhesive and molded part, and wherein, at the maximum temperature experienced by the permanent adhesive in the mold, the permanent adhesive does not ooze out around the flock fibers.

46. The method of claim 45 wherein the permanent adhesive is one of a tie coat material, a binder adhesive, and a thermosetting polyester and wherein a melting temperature of the permanent adhesive is greater than temperatures experienced by the permanent adhesive in the mold and wherein the permanent adhesive cross links with the resin, wherein the permanent adhesive is bonded to the molded part, and wherein there is no hot melt layer between the flock fibers and molded part.

47. The method of claim 45 wherein the permanent adhesive is free of a hot melt adhesive.

48. The method of claim 45 wherein the permanent adhesive is a thermosetting polyester.

49. The method of claim 45 wherein the flocked structure is a transfer and comprises a release sheet and a release adhesive positioned on a first surface defined by ends of the plurality of flock fibers, wherein the permanent adhesive is located on a second surface defined by ends of the plurality of flock fibers, and wherein the first and second surfaces are opposed to one another.

50. The method of claim 49 wherein the release sheet contacts an interior wall of the mold cavity.

51. The method of claim 50 wherein the release sheet is affixed to the interior wall with a second release adhesive.

52. The method of claim 45 wherein the permanent adhesive is a tie coat material.

53. The method of claim 45 wherein the permanent adhesive is a binder adhesive.

54. The method of claim 1 further comprising before the molding step:
  forming the transfer into a nonplanar, three-dimensional shape, wherein there is no hot melt adhesive layer located between the permanent adhesive and resin.

55. The method of claim 8 further comprising before the molding step:
  forming the design into a nonplanar, three-dimensional shape and wherein there is no hot melt adhesive layer located between the permanent adhesive and resin.

56. The method of claim 22 further comprising before the introducing step:
  forming the flocked structure into a nonplanar, three-dimensional shape and wherein there is no hot melt adhesive layer located between the permanent adhesive and molded part.

57. The method of claim 45 further comprising before the introducing step:
  forming the flocked structure into a nonplanar, three-dimensional shape, wherein there is no hot melt layer between the permanent adhesive and molded part.

* * * * *